(No Model.) 7 Sheets—Sheet 1.

E. HERISSÉ.

MACHINERY FOR PIPING OR DECORATING BISCUITS, &c.

No. 369,789. Patented Sept. 13, 1887.

Witnesses
J. H. Riches
F. J. Stanmore

Inventor
Emile Herissé
By F. Prince
Attorney (No Model.) 7 Sheets—Sheet 2.
E. HERISSÉ.
MACHINERY FOR PIPING OR DECORATING BISCUITS, &c.
No. 369,789. Patented Sept. 13, 1887.
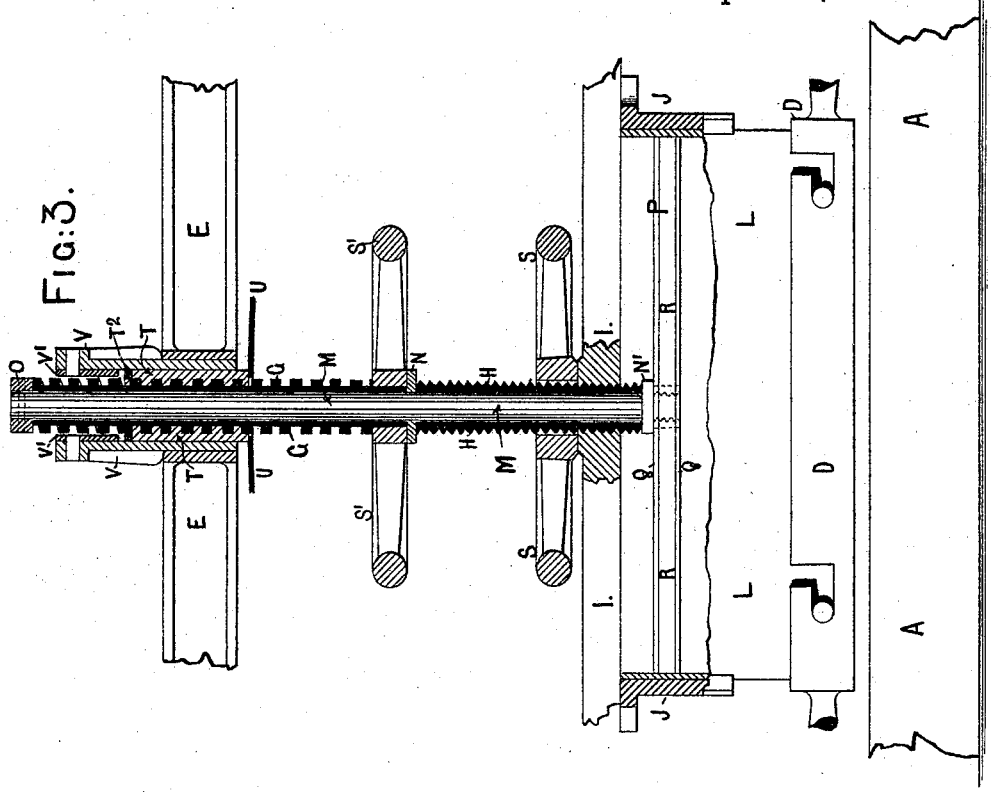
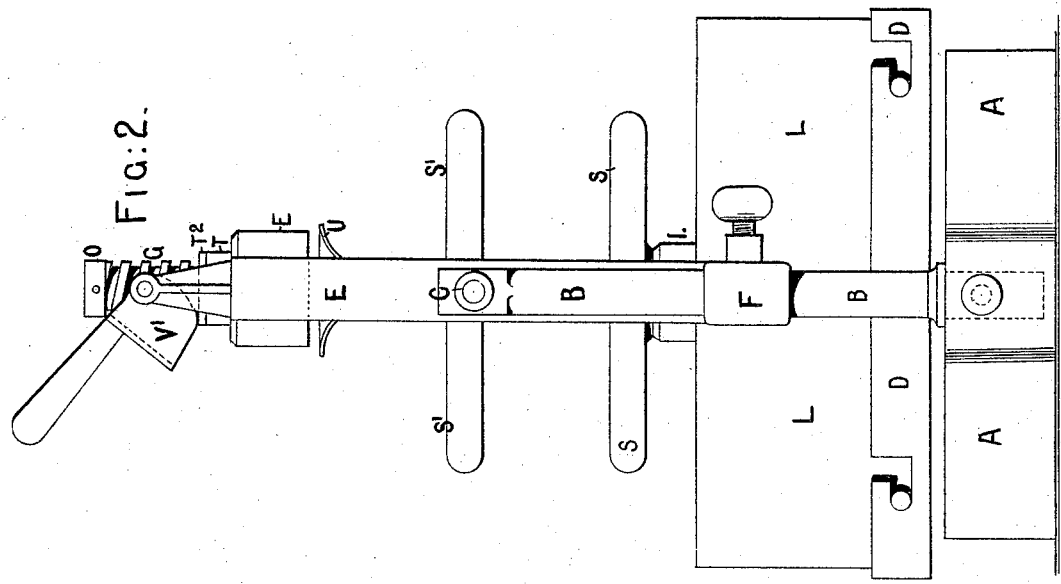
Witnesses
J. H. Riches
F. I. Hammore
Inventor
Emile Herissé
By F. Prince
Attorney (No Model.)
7 Sheets—Sheet 3.
E. HERISSÉ.
MACHINERY FOR PIPING OR DECORATING BISCUITS, &c.
No. 369,789.
Patented Sept. 13, 1887.
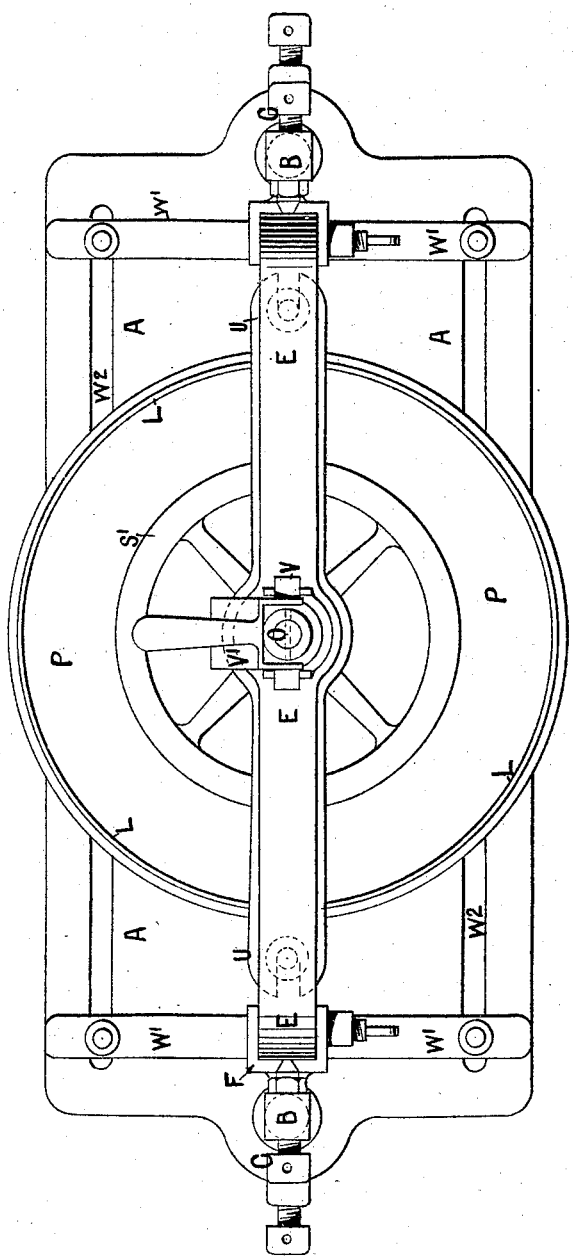
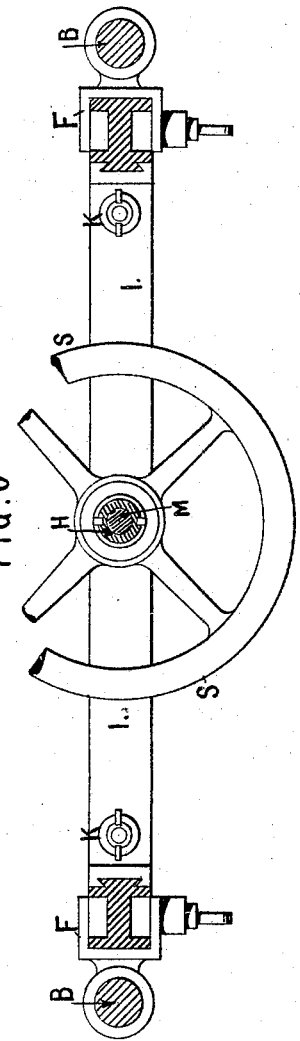
Witnesses
J. H. Riches
F. J. Harmore
Inventor
Emile Herissé
By F. Prince
Attorney (No Model.) 7 Sheets—Sheet 4.
E. HERISSÉ.
MACHINERY FOR PIPING OR DECORATING BISCUITS, &c.
No. 369,789. Patented Sept. 13, 1887.
Fig: 6.
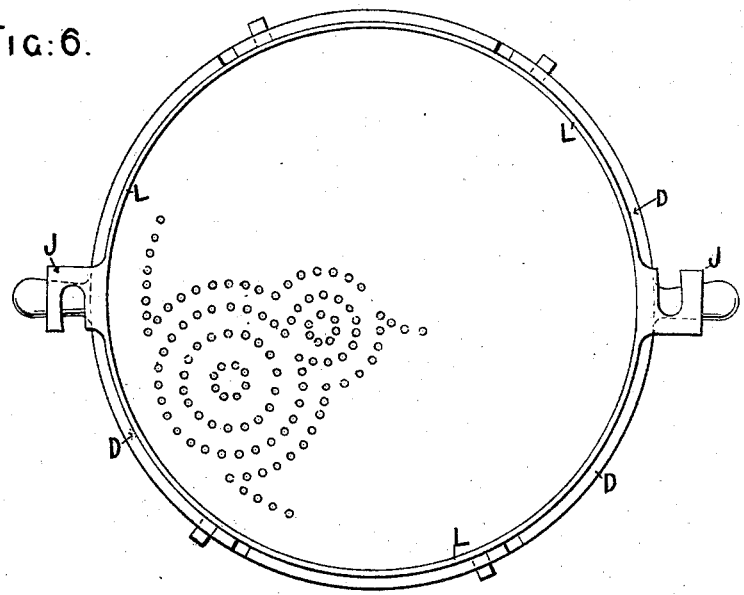
Fig: 7.
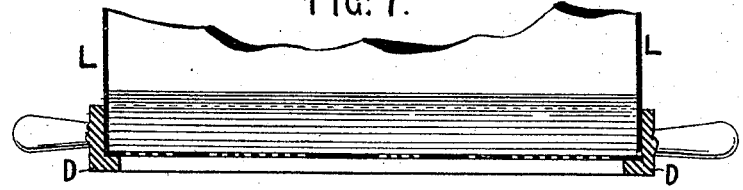
Fig: 8.
Fig: 9.
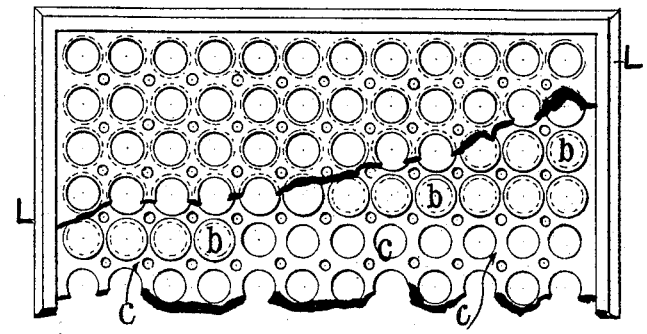
Fig: 10.
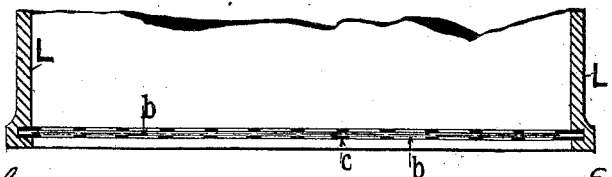
Witnesses
J. H. Riches
F. J. Stanmore
Inventor
Emile Herissé
By F. Prince
Attorney (No Model.) 7 Sheets—Sheet 5.

E. HERISSÉ.

MACHINERY FOR PIPING OR DECORATING BISCUITS, &c.

No. 369,789. Patented Sept. 13, 1887.

Witnesses
J. H. Rickes
F. L. Hammore

Inventor
Emile Herissé
By F. Prince
Attorney (No Model.) 7 Sheets—Sheet 7.
E. HERISSÉ.
MACHINERY FOR PIPING OR DECORATING BISCUITS, &c.

No. 369,789. Patented Sept. 13, 1887.

Witnesses
Inventor
Emile Herissé
By F. Prince
Attorney

United States Patent Office.

EMILE HERISSÉ, OF DALSTON, COUNTY OF MIDDLESEX, ENGLAND.

MACHINERY FOR PIPING OR DECORATING BISCUITS, &c.

SPECIFICATION forming part of Letters Patent No. 369,789, dated September 13, 1887.

Application filed January 28, 1887. Serial No. 225,825. (No model.) Patented in England March 26, 1886, No. 4,264; in France December 31, 1886, No. 180,644; in Belgium January 10, 1887, No. 75,897, and in Canada April 4, 1887, No. 26,879.

*To all whom it may concern:*

Be it known that I, EMILE HERISSÉ, a citizen of the French Republic, now residing at Dalston, in the county of Middlesex, England, have invented new and useful Machinery for Piping or Decorating Biscuits and Cakes and Making Designs or Shapes of Icing and Ornamental Biscuits, (for which I have obtained a patent in England, No. 4,264, bearing date March 26, 1886; in France, No. 180,644, bearing date December 31, 1886; in Belgium, No. 75,897, bearing date January 10, 1887, and in Canada, No. 26,879, bearing date April 4, 1887,) of which the following is a specification.

By this invention large cakes or a number of biscuits can be "piped" or ornamented at the same time, and the same done in a much superior manner to what can now be done by hand-work.

The invention is also suitable for making various designs of "icing" and ornamental biscuits. I attain these objects by the mechanism illustrated in the accompanying drawings, in which—

Figure 1:
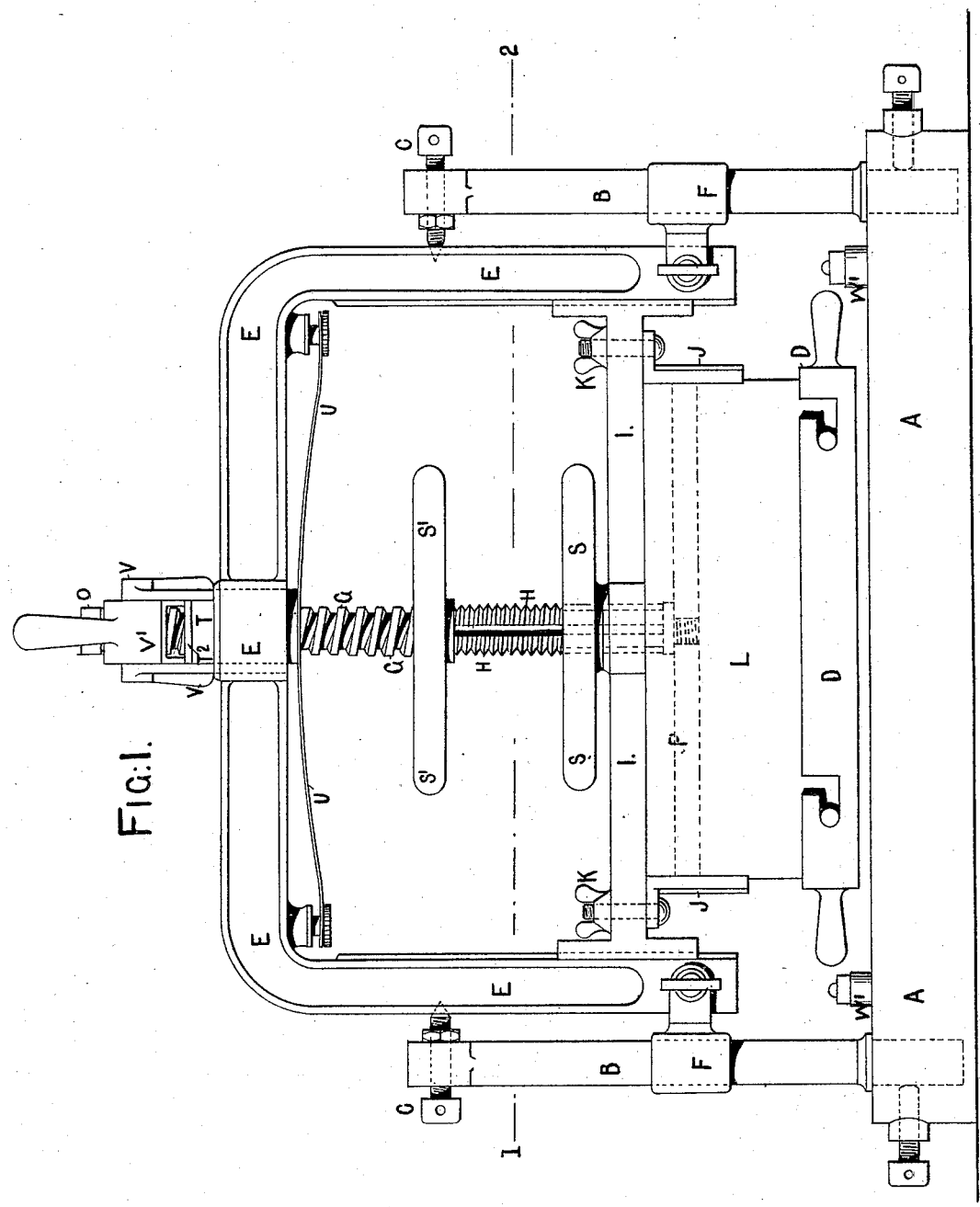
Figure 11:
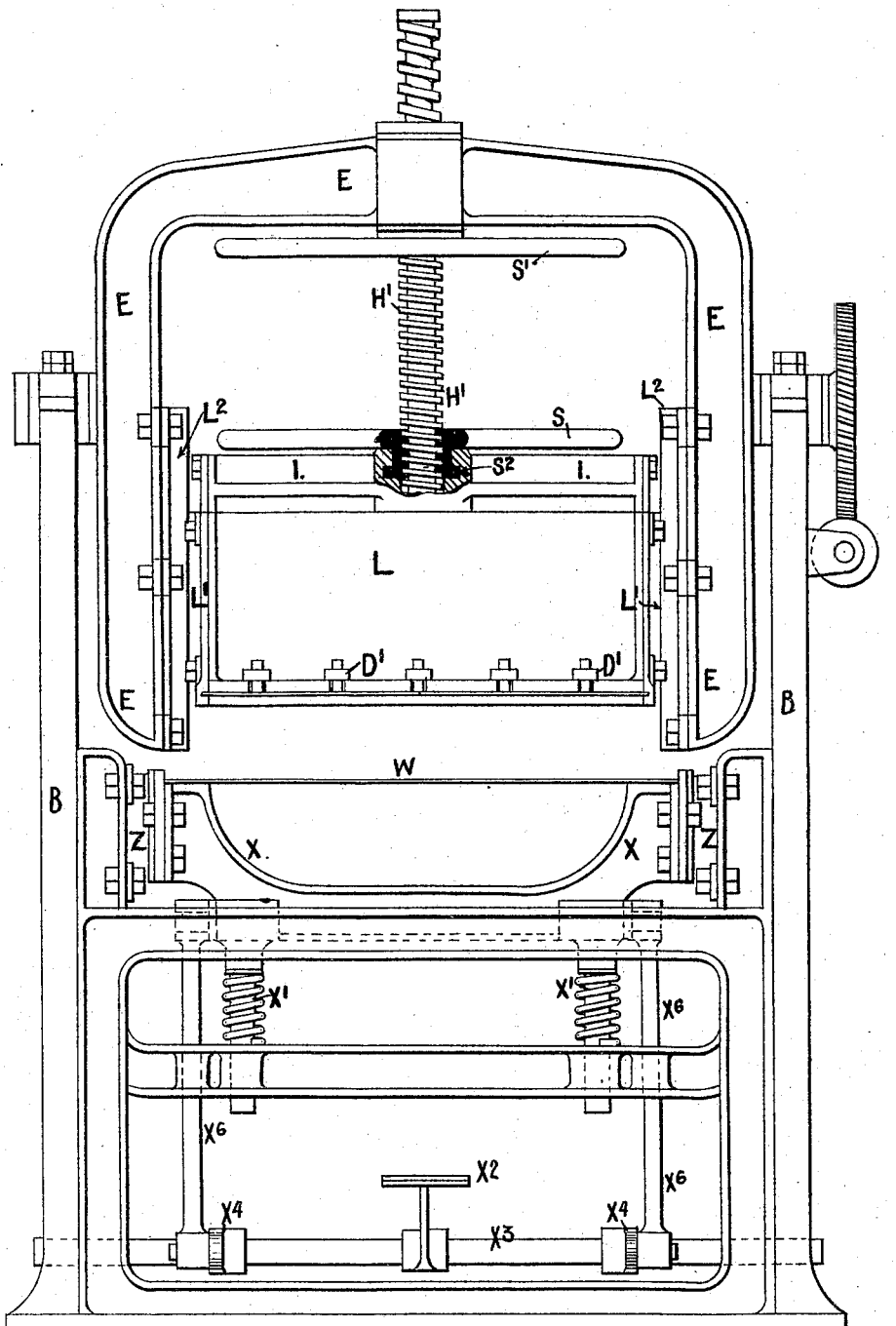
Figure 12:
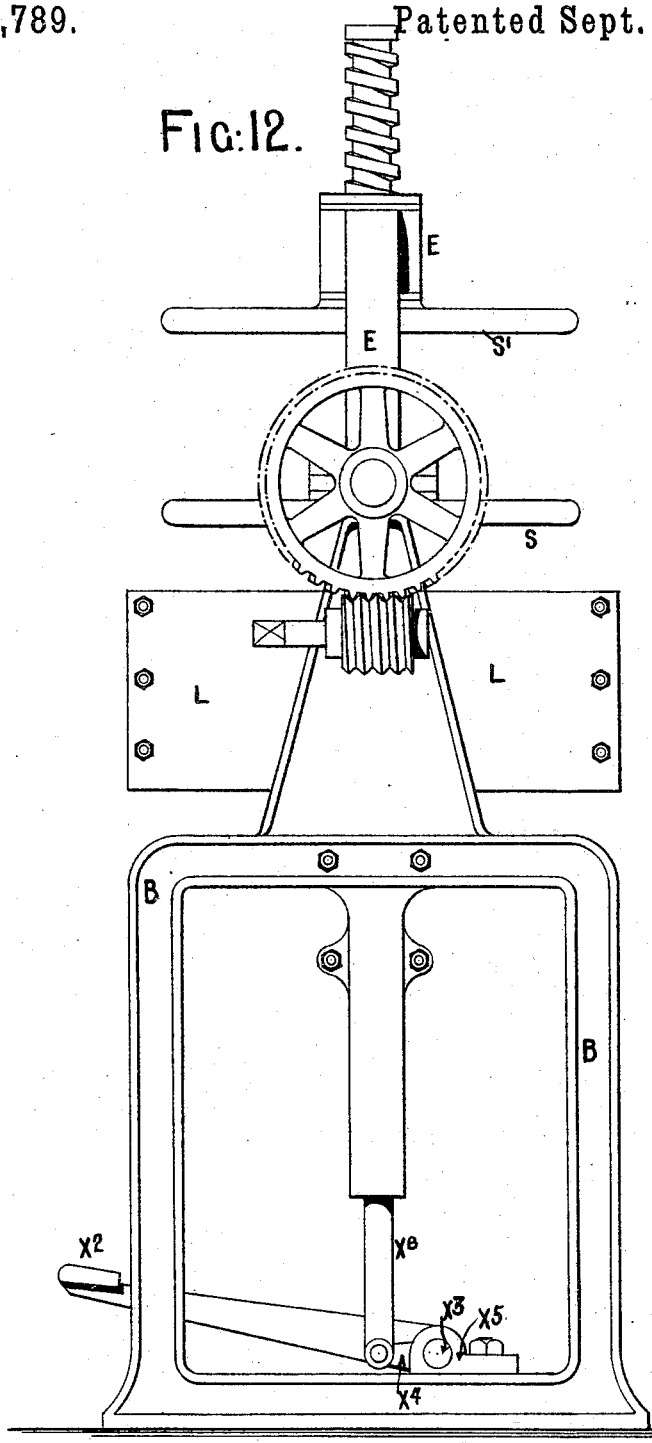
Figure 13:
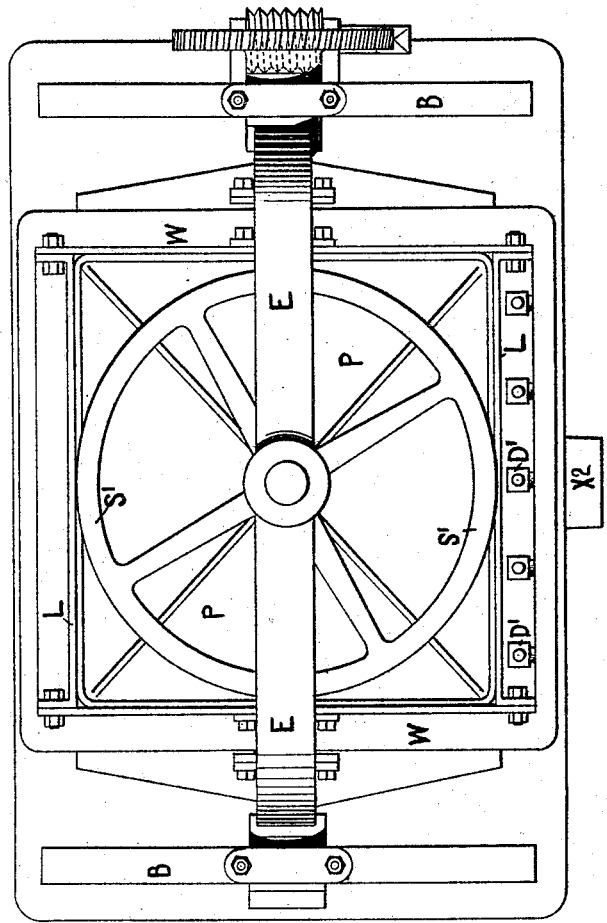

Figure 1 is a front elevation of a machine for piping or ornamenting cakes; Fig. 2, a side elevation; Fig. 3, a partial front elevation; Fig. 4, a plan; Fig. 5, a horizontal section at 1 2, Fig. 1; Figs. 6 and 7, plan and vertical sectional views, respectively, of chamber for holding mixing; Fig. 8, an enlarged sectional view of perforated bottom; Fig. 9, a partial view of square bottom for piping or making one hundred and forty-four biscuits at same time; Fig. 10, a vertical section of preceding figure and means for holding same; Fig. 11, a front elevation of a machine for piping or making one hundred and forty-four biscuits at same time; Figs. 12 and 13, end elevation and plan, respectively, of preceding figure.

Referring to Figs. 1 to 10, A is a bed-plate of cast-iron, having attached standards B, fitted at upper parts with point-bearings C for a frame, E, to turn upon. Sliding on standards B are stops F, to hold frame in working position. Suspended in frame on pendent screws G H is a bridge, I, arranged to work up and down in suitable grooves in frame. To this bridge I is attached by slotted projections J and thumb-screws K a chamber, L, to hold the icing or mixing to be expressed through perforations in bottom upon cakes, biscuits, or tin placed under bottom for this purpose. The bottom (see Figs. 6, 7, and 8) is made of thin metal, the designs being formed of a number of small holes or slots of various shapes through which the mixing is expressed, and which partakes of the design. These holes are drilled through under projections $a$, cast on the plate. (See Fig. 8.) Fig. 6 shows a portion of a design made as described for ornamenting the top of large cakes.

Fig. 9 shows a partial view of a square bottom for ornamenting or making one hundred and forty-four biscuits at same time. This bottom is of stouter metal than the bottom previously described. The large holes are drilled through the metal plate without projections $a$, but under each hole a separate plate or "pipe," $b$, is held, made with a design, as described, with under projections $a$. These plates are retained in their place by an outside plate, $c$, with holes corresponding to those in the bottom, and are screwed onto the bottom. The round bottom is held to bottom of chamber by a collar, D, with flange, and attached to chamber by studs and bayonet-slot, the collar being fitted with handles to take it off, and the square bottom, as hereinafter described.

The screws G H are tubular and carried on a vertical spindle, M, (see Fig. 3,) with a collar, N, in middle. The thread of the screw G is twice the size of that of H, and is retained on upper portion of spindle M by a collar, O, and the screw H is held on the lower portion of spindle by the collar N and bottom collar, N'. Both screws are free to turn on spindle. The lower end of spindle passes through bridge I and is connected to a piston, P, in chamber. This piston may consist of two plates of metal and a disk of leather between, the three pieces being held together by screws.

The piston and chamber have a differential movement imparted to them during working in the following manner: The screw H engages with the sliding bridge I, and is turned by hand-wheel S, loose on screw, but engaging latter by means of a feather and vertical groove. The upper screw, G, is fitted with a nut, T, arranged to have a sliding movement in bridge of frame and prevented from turning by groove and stud, and held in by spring U. The latter may be connected in the frame E, as shown in drawings. At the bottom of screw G is fixed a hand-wheel, S'. By turning the two wheels together the chamber and piston are raised together by the upper screw, G, and the bottom of chamber brought nearer to piston by lower screw, H, thereby expressing mixing through perforations in bottom. The rising of the chamber L while expressing mixing prevents any blurring of the design, which result is assisted by the under projections, $a$, of the pipes. To "cut off," it is necessary to stop expressing, and lift both chamber and piston together. This may be effected by only turning the hand-wheel S', or by a spring arrangement, as follows: On top of bridge of frame are fitted standards V, to carry an eccentric-cam, V', fitted with handle for actuating same. This cam acts upon the top of sliding nut T, to press the same down, which acts upon spring and also brings down chamber to the position for working. After expression of mixing, the the cut-off can be instantly effected by throwing up cam to allow the spring to act on nut T, to raise chamber and piston together. The top of nut T is fitted with a steel plate, $T^2$, for the cam to act upon; or the cut-off could be effected by an arrangement to cause the tin which carries the biscuits to be quickly lowered, while the piston and chamber remain stationary. A simple way to do this is illustrated at Figs. 11, 12, and 13, which is an arrangement of machinery for making or piping a tin of biscuits—that is, one hundred and forty-four—at the same time. In this plan the chamber L is made square. W is the tin of or for biscuits placed under chamber L, preparatory to expressing mixing, carried upon a table, X, working in side slides, Z, bolted to main standards of frame and guided by two stems, X', working through guides in cross-piece bolted to standards. The table is held up by spiral springs on stems X', the lowering of the table being effected by the foot pressing down treadle $X^2$, attached to a cross-shaft, $X^3$, fitted with projections $X^4$, having lateral journal-bearings $X^5$ for connecting-rods $X^6$, connected to table X, as shown by dotted lines. On releasing the foot from treadle the spiral springs bring up table to working position for tin. The use of a spring to table has a further advantage of preventing any jar to the tin on the table being quickly pulled down. In the arrangement shown at these figures (11, 12, 13) the revolving frame E is carried by axles and turned by worm and wheel, and the perforated bottom used is that shown at Fig. 9. This bottom is held in chamber L by grooves and drawn close at entrance by screws and nuts D' and slots in a flange at bottom of chamber. In this view the chamber L is fitted with slides L' to work in slide-grooves $L^2$, bolted to revolving frame E, and the bridge I is bolted to top of chamber L. The wheel S is formed with an under boss, $S^2$, through which the screw H' passes and engages. This boss $S^2$ has a bottom flange let into bridge to suspend chamber and turns in bridge. Turning the wheel S moves chamber L on piston, and turning the two wheels together effects the differential movement, as has been explained.

When piping biscuits, the latter are so arranged on the tin that each biscuit comes directly under each pipe. To enable different-size tins to be held, the bed-plate A or table for tins is fitted with guides W', working in slots $W^2$ and secured by thumb-screw.

To fill the chamber L the revolving part of machine is turned on the bearings to bring the bottom uppermost, which is drawn out or taken off, and mixing poured in and bottom replaced. While doing this, the frame can be held by the stops F.

In making designs of icing or ornamental biscuits by this invention the mixing is expressed onto a tin or paper and baked or left to harden in the usual way.

Having fully described my invention, what I desire to claim and secure by Letters Patent is—

1. The combination of parts forming the new machinery, for the purpose stated, consisting of the revolving frame E, pendent screws G H, bridge I, chamber L, with perforated bottom, spindle M, piston P, hand-wheels S and S', nut T, spring U, and cam V', the whole constructed and operating substantially as hereinbefore described, and represented in the accompanying drawings.

2. The combination of parts forming the new machinery, for the purposes stated, consisting of the revolving frame E, pendent screws G and H', bridge I, with attached chamber L, with perforated bottom, spindle M', piston P, hand-wheels S and S', boss $S^2$, and falling table X, the whole constructed and operating substantially as hereinbefore described, and represented in the accompanying drawings.

3. In machinery for the purposes stated, the combination of the screw H, bridge I, chamber L, and hand-wheel S', as and for the purposes described.

4. In machinery for the purposes stated, the combination, with the screw G, with hand-wheel, of the frame E, spindle M, collar N, screw H, bridge I, and chamber L, for effecting the cut off, as hereinbefore described.

5. In machinery for the purposes stated, the combination, with the screw G, of the sliding nut T, cam V, and spring U, for effecting the cut off, as hereinbefore described.

6. In machinery for the purposes stated, the combination, with the frame E, of the screws G and H, provided with hand-wheels to enable a differential movement to be imparted to chamber L and piston P, as described.

7. In machinery for the purposes stated, the combination of the bed-plate A, standards B, bearings C, revolving frame E, and suspended chamber L, as and for the purpose stated.

Witnesses:       EMILE HERISSÉ.
  JNO. DEAN,
  WALTER J. SKERTEN,
*Both of 17 Gracechurch Street, London, E. C.*